(12) United States Patent
Raghavan et al.

(10) Patent No.: US 12,506,546 B1
(45) Date of Patent: Dec. 23, 2025

(54) TECHNIQUES FOR EQUIVALENT ISOTROPIC RADIATED POWER CONFORMANCE VERIFICATION BY A REGULATORY NODE

(71) Applicant: QUALCOMM Incorporated, San Diego, CA (US)

(72) Inventors: Vasanthan Raghavan, West Windsor Township, NJ (US); Marco Papaleo, Bologna (IT); Mustafa Emara, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/750,968

(22) Filed: Jun. 21, 2024

(51) Int. Cl.
*H04B 17/10* (2015.01)
*H04B 7/06* (2006.01)
*H04W 52/36* (2009.01)

(52) U.S. Cl.
CPC ......... *H04B 17/102* (2015.01); *H04B 7/0617* (2013.01); *H04W 52/367* (2013.01)

(58) Field of Classification Search
CPC .. H04B 17/102; H04B 7/0617; H04W 52/367
USPC ....................................................... 375/262
See application file for complete search history.

(56) References Cited

U.S. PATENT DOCUMENTS

| 9,397,733 B2 * | 7/2016 | Paulraj ................. H04B 17/102 |
| 2020/0028558 A1 * | 1/2020 | Yerramalli ........... H04B 17/309 |

\* cited by examiner

*Primary Examiner* — Fitwi Y Hailegiorgis
(74) *Attorney, Agent, or Firm* — Holland & Hart LLP

(57) ABSTRACT

Methods, systems, and devices for wireless communications are described. A regulatory node may maintain bidirectional communications between potential aggressor nodes and potential victim nodes to enable compliance with power regulations of a given environment. For example, the regulatory node may obtain equivalent isotropic radiated power (EIRP) information corresponding to an environment in which a first node is located, where the EIRP information may include respective permissible EIRP levels over a range of angles relative to the environment. The regulatory node may monitor during a first duration, an EIRP level of a set of beams of the first node over the range of angles in accordance with the EIRP information. As such, the regulatory node may output a first compliance report associated with the first time duration, where the first compliance report indicates whether one or more of the beams conforms to the EIRP information.

20 Claims, 9 Drawing Sheets

TECHNIQUES FOR EQUIVALENT ISOTROPIC RADIATED POWER CONFORMANCE VERIFICATION BY A REGULATORY NODE

FIELD OF TECHNOLOGY

The present disclosure relates to wireless communications, including techniques for equivalent isotropic radiated power (EIRP) conformance verification by a regulatory node.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a regulatory node is described. The method may include obtaining equivalent isotropic radiated power (EIRP) information corresponding to an environment in which a first node is located, where the EIRP information includes respective permissible EIRP levels over a range of angles relative to the environment, monitoring, during a first time duration, an EIRP level of a set of multiple beams of the first node over the range of angles in accordance with the EIRP information, and outputting a first compliance report associated with the first time duration, where the first compliance report indicates whether one or more of the set of multiple beams conforms to the EIRP information.

A regulatory node for wireless communications is described. The regulatory node may include one or more memories storing processor executable code, and one or more processors coupled with the one or more memories. The one or more processors may individually or collectively be operable to execute the code to cause the regulatory node to obtain EIRP information corresponding to an environment in which a first node is located, where the EIRP information includes respective permissible EIRP levels over a range of angles relative to the environment, monitor, during a first time duration, an EIRP level of a set of multiple beams of the first node over the range of angles in accordance with the EIRP information, and output a first compliance report associated with the first time duration, where the first compliance report indicates whether one or more of the set of multiple beams conforms to the EIRP information.

Another regulatory node for wireless communications is described. The regulatory node may include means for obtaining EIRP information corresponding to an environment in which a first node is located, where the EIRP information includes respective permissible EIRP levels over a range of angles relative to the environment, means for monitoring, during a first time duration, an EIRP level of a set of multiple beams of the first node over the range of angles in accordance with the EIRP information, and means for outputting a first compliance report associated with the first time duration, where the first compliance report indicates whether one or more of the set of multiple beams conforms to the EIRP information.

A non-transitory computer-readable medium storing code for wireless communications is described. The code may include instructions executable by one or more processors to obtain EIRP information corresponding to an environment in which a first node is located, where the EIRP information includes respective permissible EIRP levels over a range of angles relative to the environment, monitor, during a first time duration, an EIRP level of a set of multiple beams of the first node over the range of angles in accordance with the EIRP information, and output a first compliance report associated with the first time duration, where the first compliance report indicates whether one or more of the set of multiple beams conforms to the EIRP information.

Some examples of the method, regulatory nodes, and non-transitory computer-readable medium described herein may further include operations, features, means, or instructions for obtaining updated EIRP information associated with a second time duration that may be after the first time duration, where the updated EIRP information includes respective updated permissible EIRP levels over the range of angles relative to the environment, monitoring, during the second time duration, the EIRP level of the set of multiple beams of the first node over the range of angles in accordance with the updated EIRP information, and outputting a second compliance report associated with the second time duration, where the second compliance report indicates whether one or more of the set of multiple beams conforms to the updated EIRP information.

Some examples of the method, regulatory nodes, and non-transitory computer-readable medium described herein may further include operations, features, means, or instructions for obtaining, from the first node, beam configuration information associated with the set of multiple beams of the first node, where the EIRP level of the set of multiple beams may be monitored during the first time duration in accordance with the beam configuration information.

In some examples of the method, regulatory nodes, and non-transitory computer-readable medium described herein, the beam configuration information includes at least beam weights associated with each of the set of multiple beams, or respective beam types associated with each of the set of multiple beams, or respective steering angles associated with each of the set of multiple beams, or an active antenna system (AAS) configuration associated with the set of multiple beams, or a combination thereof.

Some examples of the method, regulatory nodes, and non-transitory computer-readable medium described herein may further include operations, features, means, or instructions for obtaining, from a second node, a message indicating that a signal interference at the second node satisfies an interference threshold and outputting, to the first node as part of the first compliance report, a request for compliance with the EIRP information based on the signal interference at the second node satisfying the interference threshold.

Some examples of the method, regulatory nodes, and non-transitory computer-readable medium described herein may further include operations, features, means, or instructions for obtaining a compliance satisfaction report from the first node indicating that the first node may have changed to comply with the EIRP information based on the request for compliance.

Some examples of the method, regulatory nodes, and non-transitory computer-readable medium described herein may further include operations, features, means, or instructions for monitoring, during the first time duration, the EIRP level of the set of multiple beams of the first node based on the message, where the request for compliance may be output based on a determination that the set of multiple beams of the first node do not conform to the EIRP information.

Some examples of the method, regulatory nodes, and non-transitory computer-readable medium described herein may further include operations, features, means, or instructions for outputting, to the first node, a request for a certificate of compliance that the set of multiple beams of the first node conform to the EIRP information and obtaining, from the first node, the certificate of compliance based on the request.

In some examples of the method, regulatory nodes, and non-transitory computer-readable medium described herein, the EIRP information includes an EIRP mask associated with the environment in which the first node may be located.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
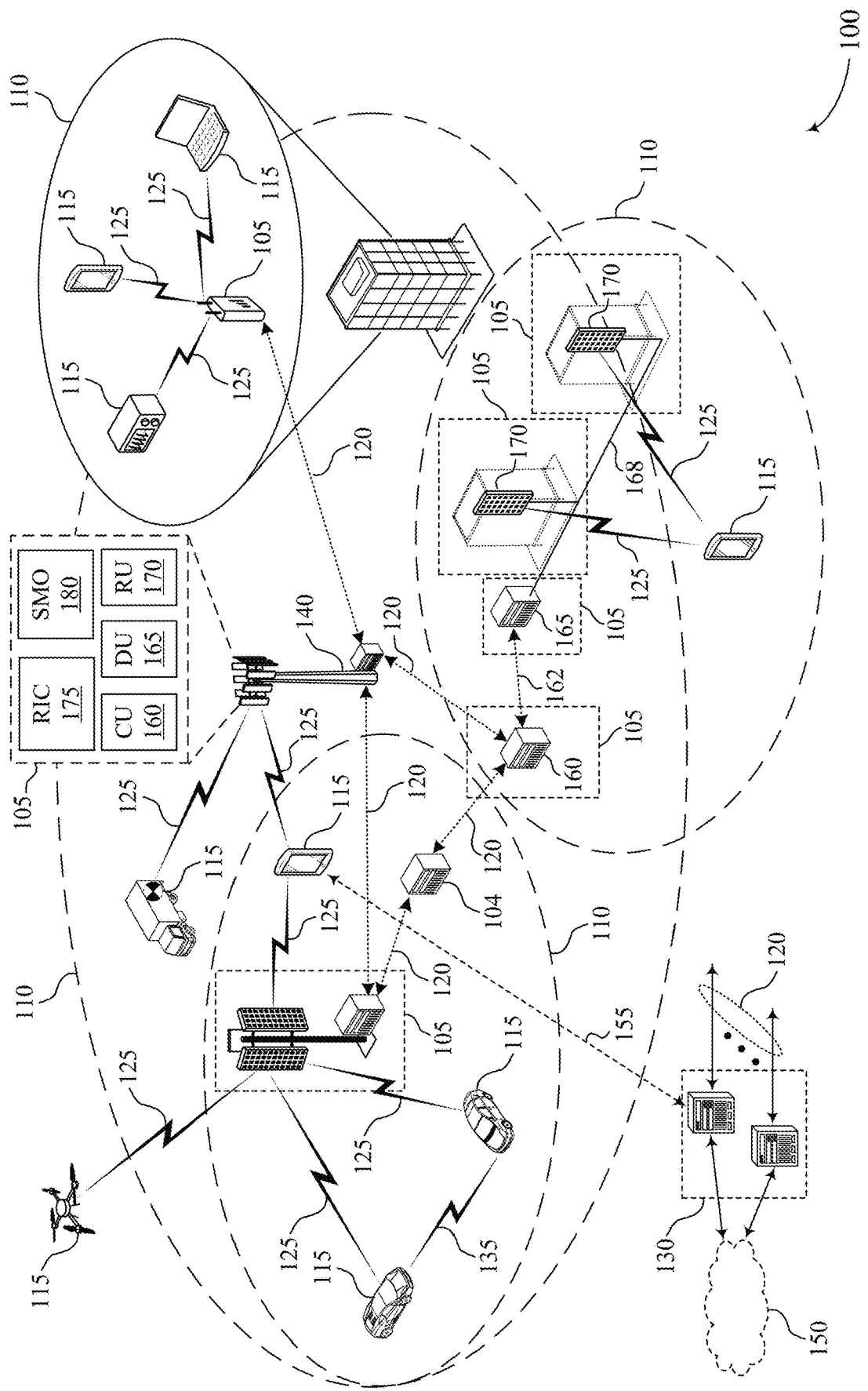
FIG. 1 shows an example of a wireless communications system that supports techniques for equivalent isotropic radiated power (EIRP) conformance verification by a regulatory node in accordance with one or more aspects of the present disclosure.

In some examples of wireless communications, a network node (e.g., a network entity or a user equipment (UE)) may service one or more wireless devices. For example, in accordance with one or more beamforming techniques, a network node may direct radio signals within a corresponding geographic coverage area to perform wireless communications with wireless devices residing within the corresponding geographic coverage area. In some examples, the wireless transmissions from the network node may correspond to a level of power, such as an equivalent or effective isotropic radiated power (EIRP). For instance, EIRP may be a total radiated power from a transmitter antenna of the network node multiplied by a numerical directivity of the antenna in the direction of a receiving wireless device. In some cases, one or more wireless devices (e.g., victim nodes) may experience an increase in interference as the EIRP of the network node increases. To reduce the interference observed at victim nodes, various tests may be performed prior to deployment of the network node to confirm the compliance of the network node with EIRP regulations of the associated environment (e.g., compliance with an EIRP mask). In some cases, however, the EIRP mask of a given environment may change after network node deployment, in accordance with dynamic EIRP mask updating. As such, it may be advantageous to ensure that the network nodes of a given environment continue to comply with the associated EIRP mask after deployment.

According to the techniques described herein, a wireless network may implement a regulatory node for use in testing EIRP compliance of one or more network nodes. For example, the regulatory node may ensure that one or more network nodes (e.g., potential aggressor nodes) are operating in accordance with a current EIRP mask of the environment by performing one or more types of conformance tests. For instance, in accordance with a first type of conformance test, the regulatory node may maintain a certificate of compliance with the one or more potential aggressor nodes over time. In accordance with a second type of conformance test, the regulatory node may measure the EIRP level over a range of different angles around a potential aggressor node based on beam configuration information obtained from the potential aggressor node. In accordance with a third type of conformance test, the regulatory node may receive signaling from a potential victim node indicating signal interference above a configured threshold caused by one or more potential aggressor nodes. Based on receiving the signaling from a potential victim node, the regulatory node may monitor the EIRP of the set of potential aggressor nodes, and signal to the likely aggressor node to comply with the EIRP mask of the environment. By operating in accordance with one or more of the EIRP conformance tests described herein, the regulatory node may increase EIRP mask compliance of each network node in a defined environment. Additionally, by increasing EIRP mask compliance, the regulatory node may reduce signal interference experienced by one or more victim nodes, which may increase reliability of wireless communications between each of the wireless devices operating within the defined environment.

Aspects of the disclosure are initially described in the context of wireless communications systems and a process flow. Aspects of the disclosure are further illustrated by and described with reference to apparatus diagrams, system diagrams, and flowcharts that relate to techniques for EIRP conformance verification by a regulatory node.

FIG. 1 shows an example of a wireless communications system 100 that supports techniques for EIRP conformance verification by a regulatory node in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. Devices in wireless communications system 100 may communicate over unlicensed spectrum, such as the 5 GHz band, the 2.4 GHz band, the 60 GHz band, the 3.6 GHz band, and/or the 900 MHz band. The unlicensed spectrum may also include other frequency bands.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM)

techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, the wireless communications system 100 may implement a network entity 105 to serve as a regulatory node. In some cases, the regulatory node may be used for testing EIRP compliance of one or more network nodes within the wireless communications system. For example, the regulatory node may ensure that one or more network nodes (e.g., potential aggressor nodes) are operating in accordance with a current EIRP mask of the environment by performing one or more types of conformance tests. For instance, in accordance with a first type of conformance test, the regulatory node may maintain a certificate of compliance with the one or more potential aggressor nodes over time. In accordance with a second type of conformance test, the regulatory node may measure the EIRP level over a range of different angles around a potential aggressor node based on beam configuration information obtained from the potential aggressor node. In accordance with a third type of conformance test, the regulatory node may receive signaling from a potential victim node indicating signal interference above a configured threshold caused by a potential aggressor node. Based on receiving the signaling from potential victim node, the regulatory node may monitor the EIRP of the potential aggressor node, and signal to the aggressor node to comply with the EIRP mask of the environment.

Figure 2:
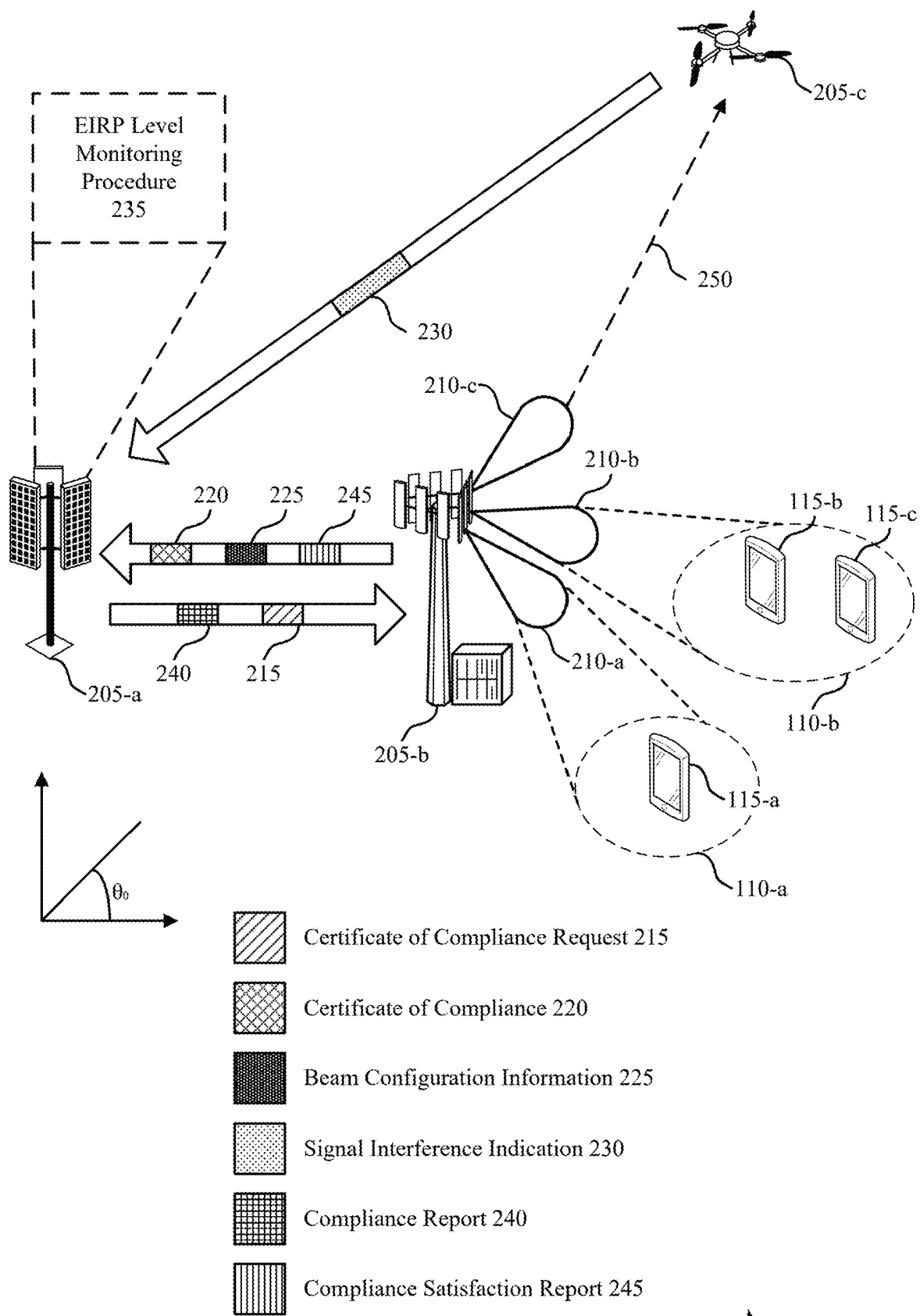
FIG. 2 shows an example of a wireless communications system that supports techniques for EIRP conformance verification by a regulatory node in accordance with one or more aspects of the present disclosure.

FIG. 2 shows an example of a wireless communications system 200 that supports techniques for EIRP conformance verification by a regulatory node in accordance with one or more aspects of the present disclosure. The wireless communications system 200 may implement or may be implemented by aspects of the wireless communications system 100. For example, the wireless communications system 200 may include a UE 115-a, 115-b, and 115-c, which may be respective examples of a UE 115 as described herein. Additionally, the wireless communications system 200 may include a node 205-a, 205-b, and 205-c, which may be respective examples of network entities 105, UEs 115, or a combination thereof.

As illustrated in FIG. 2, the node 205-b may communicate with one or more UEs 115 via one or more beams 210 (e.g., beam 210-a, 210-b, and 210-c) in accordance with beamforming techniques. For instance, beamforming may be associated with directing radio signals in specific directions to target potential receiver nodes. In some examples, beamforming relies on phased array antennas, which include multiple antenna elements. As such, by adjusting a phase and amplitude of the signal at each antenna element, the node 205-b may form a focused beam which is associated with providing wireless service over a respective geographic coverage area 110. For example, beam 210-a may provide wireless service to UE 115-a which resides within geographic coverage area 110-a and beam 210-b may provide wireless service to UE 115-b and 115-c which resides within geographic coverage area 110-b. Additionally, it is understood that a given beam 210 may provide service to a quantity of UEs 115 or other types of wireless devices described herein.

In some examples, the beams 210 may be correspond to a level of power associated with communicating wireless messages between the UEs 115 and the node 205-b. For example, EIRP may be a power parameter that is associated with a total power radiated by a set of antennas at the node 205-b as if the set of antennas radiated power equally in all directions (e.g., isotropically). In some examples, an EIRP level at the node 205-b may combine a transmitter power of the node 205-b, an antenna gain at the node 205-b, and any power losses in the transmission system of the node 205-b. As such, an EIRP level of the node 205-b may be a measure of the effective power output of the antenna system at the node 205-b.

Additionally, or alternatively, the wireless communications system may be associated in an environment that corresponds to an EIRP mask. For example, an EIRP mask may be a regulatory and technical parameter in 5G networks that dictates a threshold (e.g., maximum or average) permissible power level emitted by a transmitter in one or more specific directions. As described herein, the maximum or average EIRP threshold within the environment may be dependent on the angle (e.g., corresponding to elevation) relative to the environment. For example, the average permissible EIRP level over a set of angles may be calculated in accordance with Equation 1.

$$\bar{P}(\theta_0) = \frac{1}{KN} \sum_{k=1}^{K} \sum_{n=1}^{N} w_{n,k} P(\theta_0, \varphi_n, \theta_{TL,k}, \varphi_{SC,k}) \quad (1)$$

That is, the mean EIRP ($\bar{P}$) at a specific elevation vertical angle ($\theta_0$) may be measured by measuring the values of EIRP (P) (e.g., in mW/MHz or in dBm/MHz) towards the said elevation angle ($\theta_0$) and at a first quantity of N distinct azimuth horizontal angles ($\varphi_n$) uniformly or non-uniformly (if non-uniform, they are specified by regulations) spaced between −180° and +180° and a second quantity of K beamforming directions. As such, an EIRP mask may indicate the threshold EIRP allowed for a transmitter over a range of one or more vertical angles ($\theta_0$) corresponding to an elevation relative to a horizontal plane of the environment.

In accordance with wireless communications system 200, use of an EIRP mask for a given environment may mitigate signal interference 250. That is, the EIRP mask provides a mechanism by which an EIRP level of a potential aggressor node 205 may be controlled or mitigated such that a potential victim node 205 does not suffer from interference. For instance, in the example of FIG. 2, the node 205-c may be an example of a potential victim node 205 that may be experiencing interference 250 from the beam 210-c of node 205-b (e.g., an aggressor node 205). The node 205-c may be, for example, a drone, a satellite, or other wireless device within range of the potential aggressor node 205. In such examples, the EIRP level associated with the beam 210-c may not satisfy the EIRP mask for a physical location of the node 205-c (e.g., the EIRP of node 205-b is above the EIRP threshold at elevation vertical angle ($\theta_0$) associated with a location of the node 205-c). As such, the node 205-b may change one or more beamforming parameters described herein to comply with the EIRP threshold, which may reduce interference 250 experienced at the node 205-*c*.

In some examples, the EIRP mask may be fixed or static for a given environment. In such examples, compliance or conformance of a potential aggressor node 205 to the static EIRP mask may be based on pre-mission mode conformance tests. In some instances, such pre-mission mode conformance tests may include chamber, lab, or pre-deployment tests over a sphere of the environment where EIRP level and array gain of the potential aggressor node 205 may be tested to ensure compliance with the EIRP mask of the environment. In some examples, the pre-mission mode conformance tests may be predefined.

In some examples, an EIRP mask may be time-varying or multi-state for a given environment (e.g., a dynamic EIRP mask). For instance, a dynamic EIRP mask may be applied to the given environment for various applications such as special event scenarios. For instance, one or more low earth orbit (LEO) satellites, geostationary earth orbit (GEO) satellites, or other types of nodes 205 may be used for communications within a given environment during a given event over a first duration. As such, the given environment may be associated with a dynamic EIRP mask for the first duration to reduce interference 250 at the one or more LEO satellites, GEO satellites, or the other node 205 types. Additionally, or alternatively, one or more nodes 205 may be associated with at least one network energy savings (NES) criterion, to reduce energy consumption at the nodes 205. Such operations of NES may be associated with a respective duration, where a dynamic EIRP mask may be configured for the respective duration such that potential aggressor nodes 205 reduce an EIRP level while the nodes 205 operate at lower power in accordance with the NES criteria.

As such, it may be advantageous to ensure that potential aggressor nodes 205 are complying with dynamic EIRP masks for the environment of wireless communications system 200. For instance, one or more potential aggressor nodes 205 may be operated independently in a given environment (e.g., by different companies or wireless node 205 operators) such that a first node 205 conforms and complies with a dynamic EIRP mask while a second node 205 (e.g., the node 205-*b*) does not conform or comply with the dynamic EIRP mask.

According to the techniques described herein, the wireless communications system 200 may include a regulatory node 205 (e.g., the node 205-*a*) which may perform conformance testing of one or more potential aggressor nodes 205 within the environment of wireless communications system 200. For example, the node 205-*a* may be a regulatory node 205 which may be an explicit network-level functionality with a scope or purpose to check the conformance of a potential aggressor node 205 in the vicinity of the regulatory node 205 to specified EIRP masks (e.g., static and dynamic EIRP masks). In some examples, the node 205-*a* may be an independent entity agreed for coexistence purposes and may operate external to a network that includes the potential aggressor nodes 205. In some examples, the node 205-*a* may be implemented as a base station, a gNB, or other network entity. Additionally, or alternatively, the node 205-*a* may be an external entity and may be part of the network with certification of a role, scope, conformance, or a combination thereof provided over periodic time intervals. Additionally, or alternatively, the scope of the node 205-*a* may extend to conformance checking over multiple frequency bands and frequency resources. Additionally, or alternatively, the node 205-*a* may maintain communications with potential aggressor nodes 205 (e.g., node 205-*b*) as well as potential victim nodes 205 (e.g., node 205-*c*). The node 205-*a* may perform such communications over one or more wireless communications links (e.g., uplink, downlink, or sidelink) established with the potential aggressor nodes 205 and potential victim nodes 205.

In some examples, the EIRP mask associated with the environment may be defined (e.g., specified) by one or more regulations associated with the environment (e.g., in the case of static EIRP masks). Additionally, or alternatively the EIRP mask associated with the environment may be updated over time by external conformance bodies. For example, the node 205-*a* may receive or obtain information indicative of a dynamic EIRP mask from an external wireless network device. As such, the node 205-*a* may ensure that potential aggressor nodes 205 are operating in accordance with a current EIRP mask of the environment (e.g., static or dynamic) by performing one or more types of conformance tests. Additionally, while examples of each type of conformance test are described independently, it is understood that the node 205-*a* may operate in accordance with a combination of one or more of the types of conformance tests described herein.

In accordance with a first type of conformance test, the node 205-*a* may maintain a certificate of compliance with the one or more potential aggressor nodes 205 over time. For example, the node 205-*a* may transmit to the node 205-*b* a certificate of compliance request 215. For instance, the certificate of compliance request 215 may indicate to the node 205-*b* to determine whether the node 205-*b* is complying with the current EIRP mask of the environment. In some examples, the certificate of compliance request 215 may include an indication of the current EIRP mask for the environment. In response to the certificate of compliance request 215, the node 205-*b* may transmit to the node 205-*a* a certificate of compliance 220. For instance, the certificate of compliance 220 may indicate to the node 205-*a* that the EIRP level of the node 205-*b* complies with the current EIRP mask of the environment. In some examples, the node 205-*a* may transmit the certificate of compliance request 215 periodically (e.g., at a configured periodicity). In some examples, the node 205-*a* may transmit the certificate of compliance request 215 dynamically (e.g., based on an update to the EIRP mask). In some cases, the first type of conformance test may be a trust-based conformance test, where the node 205-*a* refrains from validating whether the node 205-*b* complies with the current EIRP mask. As such, the node 205-*a* may refrain from using the first type of conformance test if the environment includes one or more different types of potential victim nodes 205 (e.g., nodes 205 associated with mission-critical applications such as satellites, drones, among other examples).

In accordance with a second type of conformance test, the node 205-*a* may measure the EIRP level over a range of one or more different angles around a potential aggressor node 205. For example, the node 205-*a* may perform an EIRP level monitoring procedure 235 to determine an EIRP level associated with node 205-*b* over a range of one or more specific elevation vertical angles ($\theta_0$). In some cases of the second type of conformance test, the node 205-*a* may have an aerial capability. Additionally, or alternatively, the node 205-*a* may perform the EIRP level monitoring procedure 235 in accordance with beam configuration information 225 received from the node 205-*b*. For instance, the node 205-*a* may request the beam configuration information 225 from the node 205-*b* periodically, semi-statically, or dynamically. Additionally, or alternatively, the node 205-*b* may be configured to periodically, semi-statically, or dynamically transmit the beam configuration information 225 to the node 205-a to comply with defined regulations of the environment the node 205-b resides within. In some examples, the beam configuration information 225 may include beam weights used by the node 205-b, active antenna system (AAS) configurations of the node 205-b (e.g., beam tilting angles, subarray configuration parameters), or a combination thereof. As such, the node 205-a may estimate the EIRP level of the node 205-b in accordance with the obtained beam weights and the AAS configuration of the node 205-b. Additionally, or alternatively, the beam configuration information 225 may include one or more beam types used by the node 205-b (e.g., discrete Fourier Transform (DFT), Taylor window or Chebyshev window-based tapering beam weights, among other examples), a steering angle associated with each beam 210 at the node 205-b, or a combination thereof. As such, the node 205-a may estimate the EIRP level of the node 205-b in accordance with the obtained one or more beam types and one or more steering angles used by the node 205-b.

In accordance with a third type of conformance test, the node 205-a may receive signaling from a potential victim node 205 indicating a potential equivalent or effective isotropic sensitivity (EIS) violations caused by a potential aggressor node 205. For example, the node 205-c may measure a level of signal interference 250 at the node 205-c that is above a configured interference threshold. As such, the node 205-c may transmit to the node 205-a a signal interference indication 230, which may indicate that a measured signal interference 250 at the node 205-c is above the interference threshold. In some examples, the node 205-a may monitor the EIRP level of the set of one or more beams 210 of the node 205-b in response to receiving the signal interference indication 230 from the node 205-c. Additionally, or alternatively, the node 205-a may transmit a compliance report 240 to the node 205-b. For instance, the node 205-a may transmit the compliance report in response to receiving the signal interference indication 230, in response to monitoring the EIRP level of the set of beams 210, or both. In some examples, the compliance report 240 may request the node 205-b to comply with the current EIRP mask of the environment. In response to receiving the compliance report 240, the node 205-b may transmit to the node 205-a a compliance satisfaction report 245. In some examples, the compliance satisfaction report 245 may indicate compliance of the EIRP level at the node 205-b for the current EIRP mask. Additionally, or alternatively, the compliance satisfaction report 245 may indicate a modified (e.g., updated) AAS configuration of the node 205-b, one or more modified beam configuration parameters of the node 205-b, or both. As such, in accordance with the third type of conformance test the node 205-a may maintain bidirectional communications between the node 205-b (e.g., potential aggressor node 205) and the node 205-c (e.g., potential victim node 205) to enable static and dynamic EIRP mask compliance of each node 205 within the environment.

By operating in accordance with one or more of the EIRP conformance tests described herein, the node 205-a may monitor for EIRP mask violation by one or more aggressor nodes 205. As such, the node 205-a may increase EIRP mask compliance of each node 205 in wireless communications system 200. Additionally, by increasing EIRP mask compliance, the node 205-a may reduce signal interference 250 experienced by one or more victim nodes 205, which may increase the reliability of wireless communications between each of the wireless devices operating within the environment of wireless communications system 200.

Figure 3:
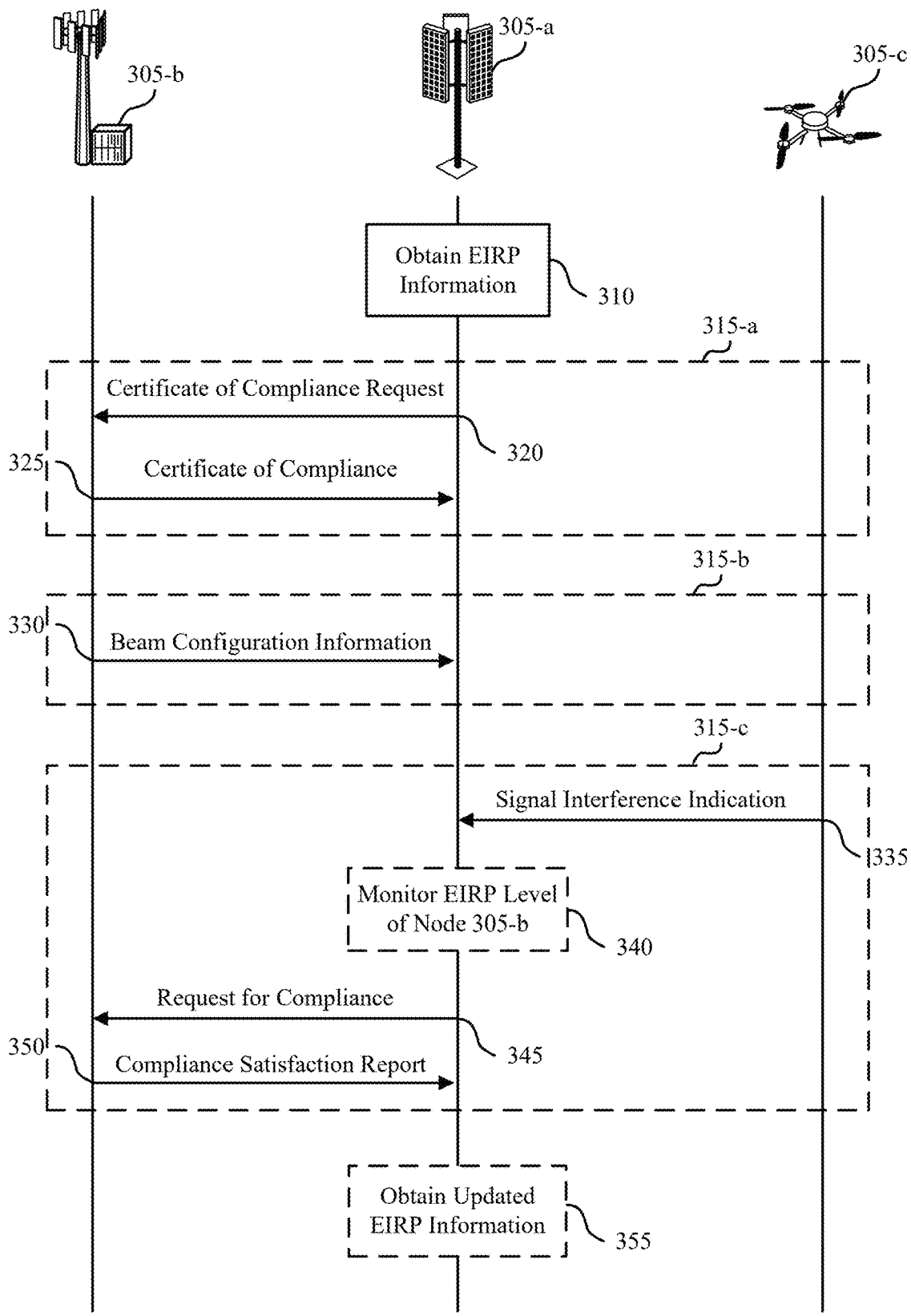
FIG. 3 shows an example of a process flow that supports techniques for EIRP conformance verification by a regulatory node in accordance with one or more aspects of the present disclosure.

FIG. 3 shows an example of a process flow 300 that supports techniques for EIRP conformance verification by a regulatory node in accordance with one or more aspects of the present disclosure. In some examples, process flow 300 may implement aspects of wireless communications system 100 and wireless communications system 200. Process flow 300 may include a node 305-a, 305-b, and 305-c which may be respective examples of nodes 205, as described with reference to FIG. 2. For example, node 305-a may be an example of a regulatory node (e.g., node 205-a), node 305-b may be an example of a potential aggressor node (e.g., node 205-b), and node 305-c may be an example of a potential victim node (e.g., node 205-c). Alternative examples of the following may be implemented, where some steps are performed in a different order than described or are not performed at all. In some cases, steps may include additional features not mentioned below, or further steps may be added. In addition, it is understood that these processes may occur between any quantity of network devices and network device types.

At 310, the node 305-a may obtain EIRP information corresponding to an environment in which the node 305-b is located, where the EIRP information includes respective permissible EIRP levels over a range of one or more angles relative to the environment. In some examples, the EIRP information may be an example of an EIRP mask associated with the environment in which the node 305-b is located (e.g., a static or dynamic EIRP mask). Additionally, node 305-a may monitor, during a first time duration, an EIRP level of a set of one or more beams of the node 305-b over the range of angles in accordance with the EIRP information. Additionally, the node 305-a may output a first compliance report associated with the first time duration, where the first compliance report indicates whether one or more of the set of beams conforms to the EIRP information.

At 315, the node 305-a may perform one or more types of conformance tests associated with monitoring and assessing the EIRP level of the node 305-b. For example, the node 305-a may monitor one or more metrics to determine an amount of measured energy in one or more directions.

In some cases, the node 305-a may operate in accordance with a first type of conformance tests associated with one or more operations at 315-a.

At 320, the node 305-a may output, to the node 305-b a request for a certificate of compliance that the set of one or more beams of the node 305-b conform to the EIRP information. In some cases, the request for a certificate of compliance may be an example of the certificate of compliance request 215, as described with reference to FIG. 2.

At 325, the node 305-a may obtain, from the node 305-b, the certificate of compliance based on the request at 320. In some cases, the certificate of compliance may be an example of the certificate of compliance 220, as described with reference to FIG. 2.

In some cases, the node 305-a may operate in accordance with a second type of conformance tests associated with one or more operations at 315-b.

At 330, the node 305-a may obtain, from the node 305-b, beam configuration information associated with the set of one or more beams of the node 305-b, where the EIRP level of the set of one or more beams is monitored during the first time duration in accordance with the beam configuration information. In some examples, the beam configuration information includes at least beam weights associated with each beam of the set of one or more beams, or respective beam types associated with each beam of the set of one or more beams, or respective steering angles associated with each beam of the set of one or more beams, or an AAS configuration associated with the set of beams, or a combination thereof. In some cases, the beam configuration information may be an example of the beam configuration information 225, as described with reference to FIG. 2.

In some examples, the node 305-a may operate in accordance with a third type of conformance tests associated with one or more operations at 315-c.

At 335, the node 305-a may obtain, from the node 305-c, a message indicating that a signal interference at the node 305-c satisfies an interference threshold. In some cases, the message may be an example of the signal interference indication 230, as described with reference to FIG. 2.

At 340, the node 305-a may optionally monitor during the first time duration, the EIRP level of the set of beams of the node 305-b based on the message, at 335. In some cases, the node 305-a monitoring during the first time duration may be an example of the EIRP level monitoring procedure 235, as described with reference to FIG. 2.

At 345, the node 305-a may output, to the node 305-b a request for compliance with the EIRP information based on the signal interference at the node 305-c satisfying the interference threshold. Additionally, or alternatively, the node 305-a may output the request for compliance based on a determination that the set of beams of the node 305-b do not conform to the EIRP information (e.g., in accordance with monitoring, at 340). In some cases, the request for compliance may be an example of the compliance report 240, as described with reference to FIG. 2.

At 350, the node may obtain a compliance satisfaction report from the node 305-b indicating that the node 305-b has changed to comply with the EIRP information based on the request for compliance. In some cases, the compliance satisfaction report may be an example of the compliance satisfaction report 245, as described with reference to FIG. 2.

At 355, the node may optionally obtain updated EIRP information associated with a second time duration that is after the first time duration. For example, the updated EIRP information may include respective updated permissible EIRP levels over the range of angles relative to the environment (e.g., associated with a dynamic EIRP mask). As such, the node 305-a may monitor, during the second time duration, the EIRP level of the set of beams of the node 305-b over the range of angles in accordance with the updated EIRP information, and output a second compliance report associated with the second time duration, where the second compliance report indicates whether one or more of the set of beams conforms to the updated EIRP information. That is, the node 305-a may perform one or more of the types of conformance tests (e.g., at 315-a, 315-b, and 315-c) in accordance with the updated EIRP information (e.g., the updated EIRP mask).

Figure 4:
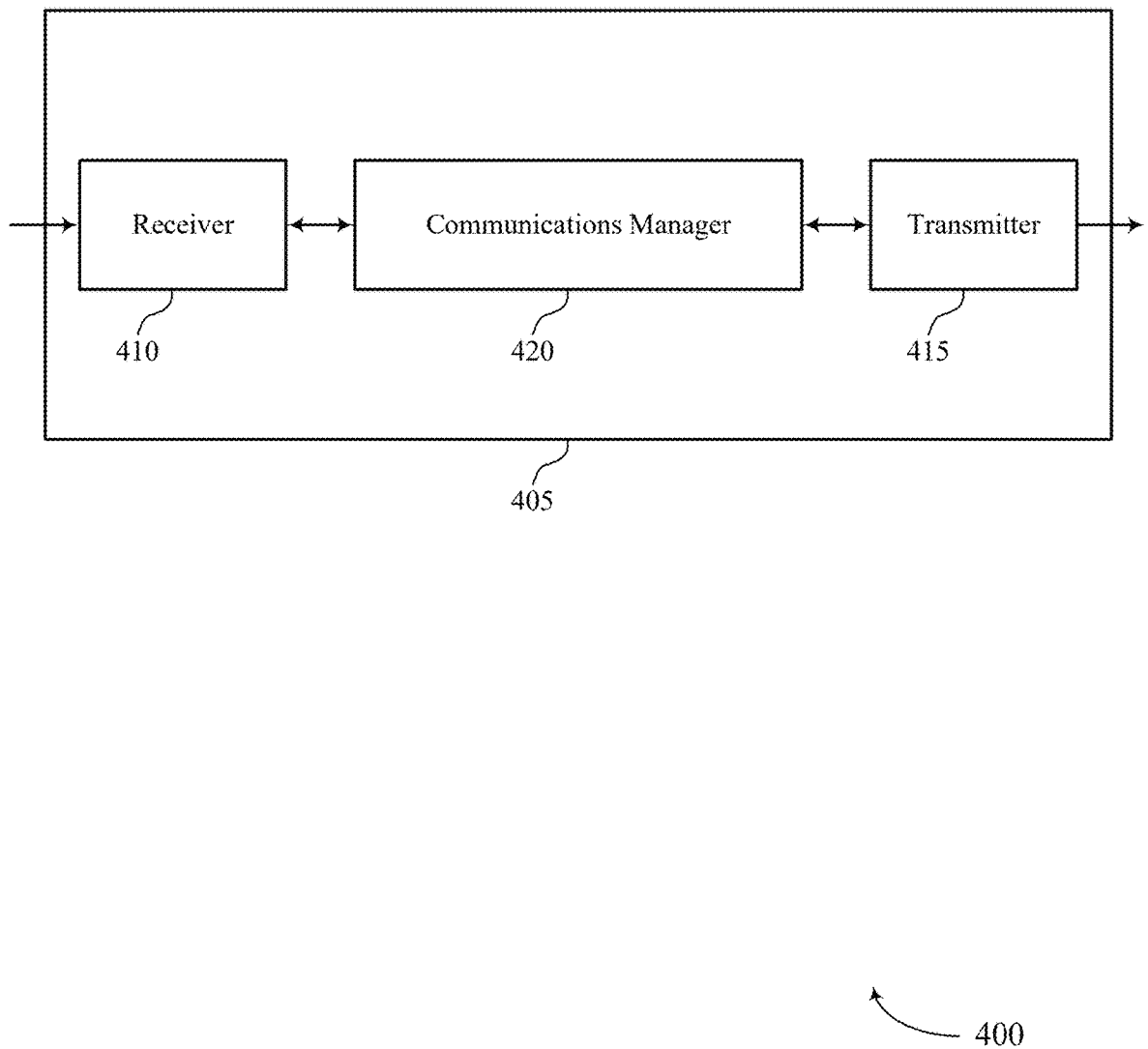
FIGS. 4 and 5 show block diagrams of devices that support techniques for EIRP conformance verification by a regulatory node in accordance with one or more aspects of the present disclosure.

FIG. 4 shows a block diagram 400 of a device 405 that supports techniques for EIRP conformance verification by a regulatory node in accordance with one or more aspects of the present disclosure. The device 405 may be an example of aspects of a network entity or a regulatory node as described herein. The device 405 may include a receiver 410, a transmitter 415, and a communications manager 420. The device 405, or one or more components of the device 405 (e.g., the receiver 410, the transmitter 415, the communications manager 420), may include one or more processors, memory coupled with the one or more processors, and instructions stored in the memory that are executable by the one or more processors to enable the one or more processors to perform the EIRP conformance verification features discussed herein. Each of these components may be in communication with one another (e.g., via one or more buses).

The receiver 410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 405. In some examples, the receiver 410 may support obtaining information by receiving signals via one or more antennas. Additionally, or alternatively, the receiver 410 may support obtaining information by receiving signals via one or more wired (e.g., electrical, fiber optic) interfaces, wireless interfaces, or any combination thereof.

The transmitter 415 may provide a means for outputting (e.g., transmitting, providing, conveying, sending) information generated by other components of the device 405. For example, the transmitter 415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 415 may support outputting information by transmitting signals via one or more antennas. Additionally, or alternatively, the transmitter 415 may support outputting information by transmitting signals via one or more wired (e.g., electrical, fiber optic) interfaces, wireless interfaces, or any combination thereof. In some examples, the transmitter 415 and the receiver 410 may be co-located in a transceiver, which may include or be coupled with a modem.

The communications manager 420, the receiver 410, the transmitter 415, or various combinations or components thereof may be examples of means for performing various aspects of techniques for EIRP conformance verification by a regulatory node as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for obtaining EIRP information corresponding to an environment in which a first node is located, where the EIRP information includes respective permissible EIRP levels over a range of angles relative to the environment. The communications manager 420 is capable of, configured to, or operable to support a means for monitoring, during a first time duration, an EIRP level of a set of multiple beams of the first node over the range of angles in accordance with the EIRP information. The communications manager 420 is capable of, configured to, or operable to support a means for outputting a first compliance report associated with the first time duration, where the first compliance report indicates whether one or more of the set of multiple beams conforms to the EIRP information.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced processing, reduced power consumption, more efficient utilization of communication resources.

Figure 5:
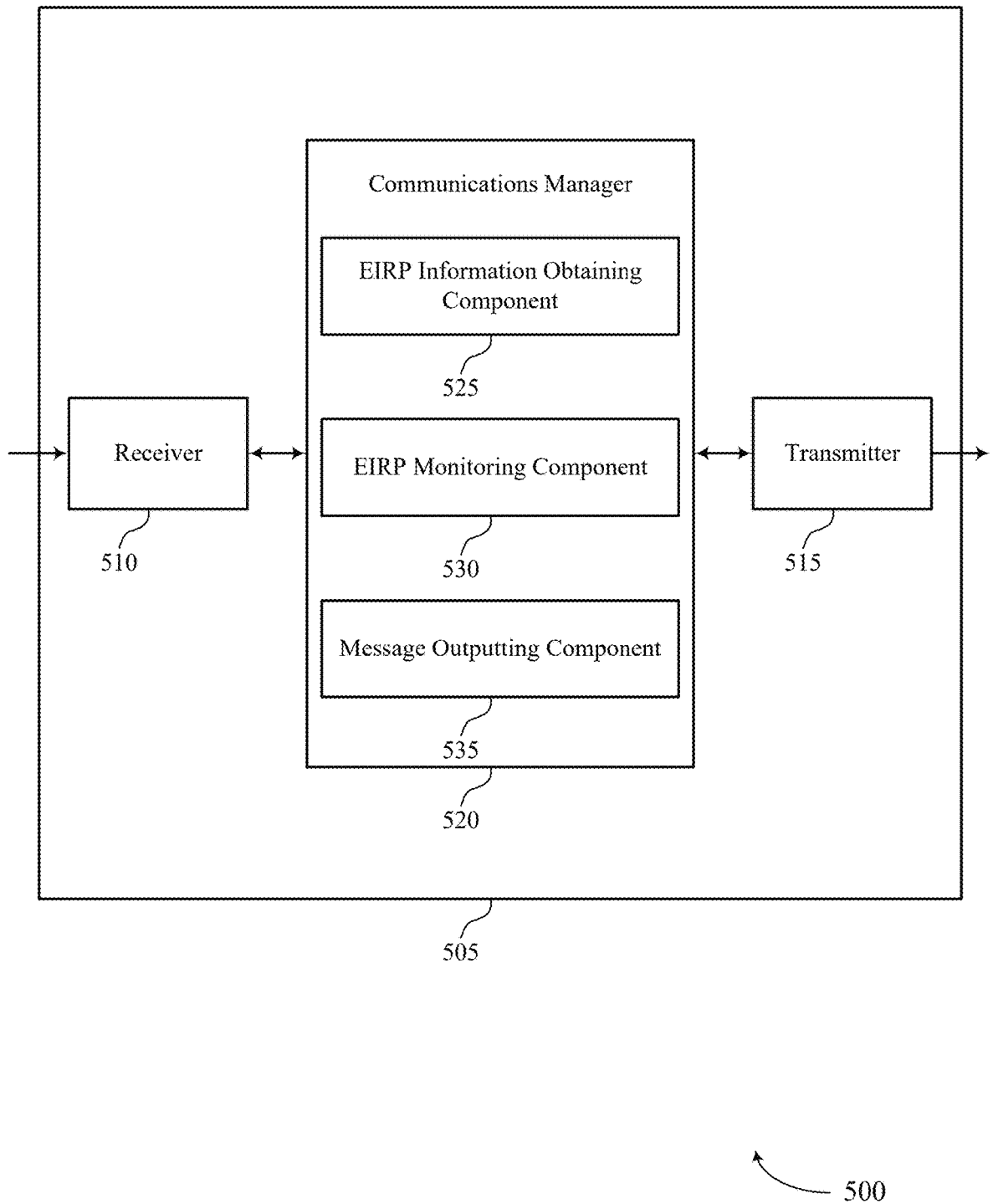

FIG. 5 shows a block diagram 500 of a device 505 that supports techniques for EIRP conformance verification by a regulatory node in accordance with one or more aspects of the present disclosure. The device 505 may be an example of aspects of a device 405, or a network entity 105, or a regulatory node as described herein. The device 505 may include a receiver 510, a transmitter 515, and a communications manager 520. The device 505, or one of more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The device 505, or various components thereof, may be an example of means for performing various aspects of techniques for EIRP conformance verification by a regulatory node as described herein. For example, the communications manager 520 may include an EIRP information obtaining component 525, an EIRP monitoring component 530, a message outputting component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The EIRP information obtaining component 525 is capable of, configured to, or operable to support a means for obtaining EIRP information corresponding to an environment in which a first node is located, where the EIRP information includes respective permissible EIRP levels over a range of angles relative to the environment. The EIRP monitoring component 530 is capable of, configured to, or operable to support a means for monitoring, during a first time duration, an EIRP level of a set of multiple beams of the first node over the range of angles in accordance with the EIRP information. The message outputting component 535 is capable of, configured to, or operable to support a means for outputting a first compliance report associated with the first time duration, where the first compliance report indicates whether one or more of the set of multiple beams conforms to the EIRP information.

In some cases, the EIRP information obtaining component 525, the EIRP monitoring component 530, and the message outputting component 535 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the EIRP information obtaining component 525, the EIRP monitoring component 530, and the message outputting component 535 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
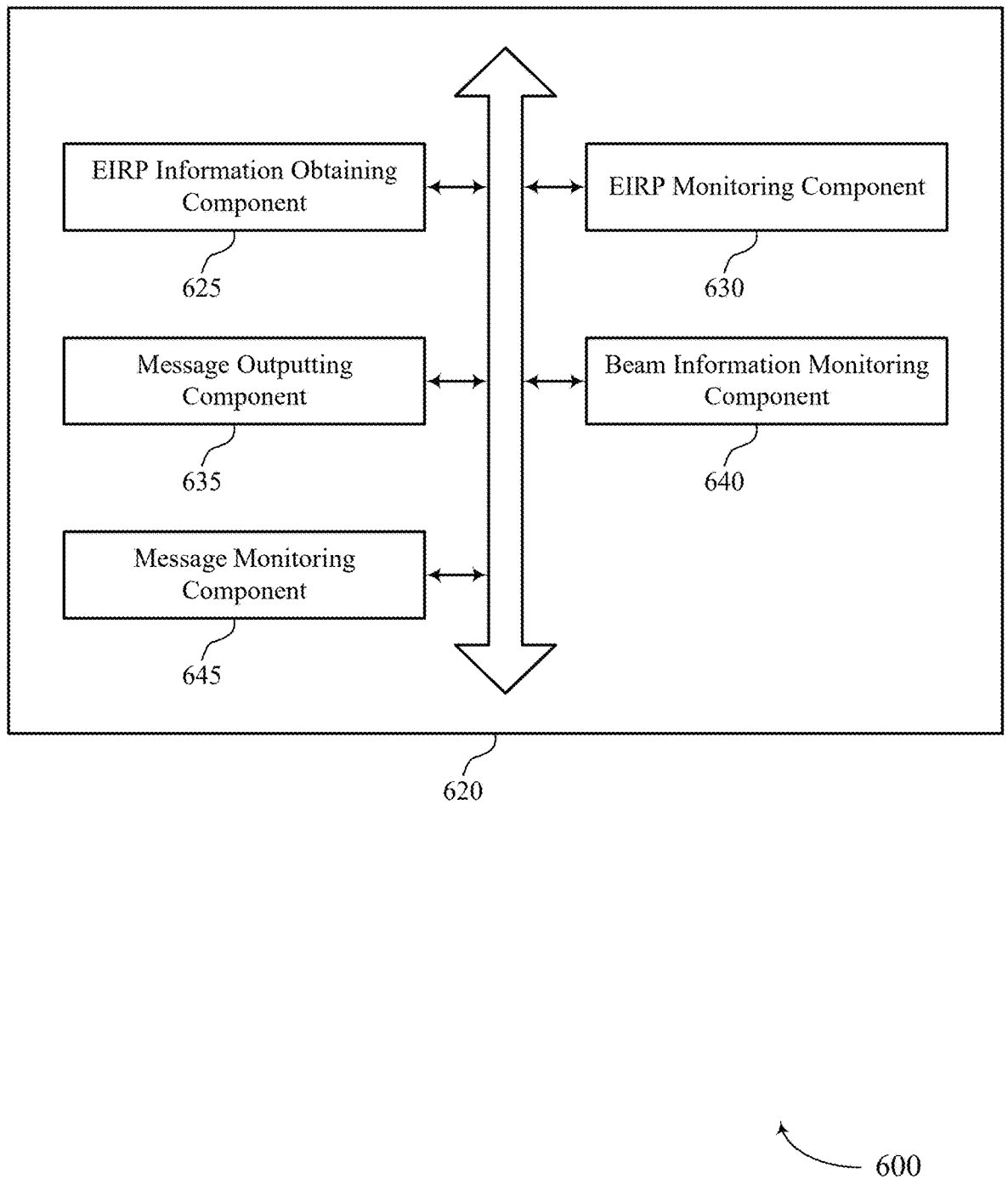
FIG. 6 shows a block diagram of a communications manager that supports techniques for EIRP conformance verification by a regulatory node in accordance with one or more aspects of the present disclosure.

FIG. 6 shows a block diagram 600 of a communications manager 620 that supports techniques for EIRP conformance verification by a regulatory node in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for EIRP conformance verification by a regulatory node as described herein. For example, the communications manager 620 may include an EIRP information obtaining component 625, an EIRP monitoring component 630, a message outputting component 635, a beam information monitoring component 640, a message monitoring component 645, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communications in accordance with examples as disclosed herein. The EIRP information obtaining component 625 is capable of, configured to, or operable to support a means for obtaining EIRP information corresponding to an environment in which a first node is located, where the EIRP information includes respective permissible EIRP levels over a range of angles relative to the environment. The EIRP monitoring component 630 is capable of, configured to, or operable to support a means for monitoring, during a first time duration, an EIRP level of a set of multiple beams of the first node over the range of angles in accordance with the EIRP information. The message outputting component 635 is capable of, configured to, or operable to support a means for outputting a first compliance report associated with the first time duration, where the first compliance report indicates whether one or more of the set of multiple beams conforms to the EIRP information.

In some examples, the EIRP information obtaining component 625 is capable of, configured to, or operable to support a means for obtaining updated EIRP information associated with a second time duration that is after the first time duration, where the updated EIRP information includes respective updated permissible EIRP levels over the range of angles relative to the environment. In some examples, the EIRP monitoring component 630 is capable of, configured to, or operable to support a means for monitoring, during the second time duration, the EIRP level of the set of multiple beams of the first node over the range of angles in accordance with the updated EIRP information. In some examples, the message outputting component 635 is capable of, configured to, or operable to support a means for outputting a second compliance report associated with the second time duration, where the second compliance report indicates whether one or more of the set of multiple beams conforms to the updated EIRP information.

In some examples, the beam information monitoring component 640 is capable of, configured to, or operable to support a means for obtaining, from the first node, beam configuration information associated with the set of multiple beams of the first node, where the EIRP level of the set of multiple beams is monitored during the first time duration in accordance with the beam configuration information.

In some examples, the beam configuration information includes at least beam weights associated with each of the set of multiple beams, or respective beam types associated with each of the set of multiple beams, or respective steering angles associated with each of the set of multiple beams, or an AAS configuration associated with the set of multiple beams, or a combination thereof.

In some examples, the message monitoring component 645 is capable of, configured to, or operable to support a means for obtaining, from a second node, a message indicating that a signal interference at the second node satisfies an interference threshold. In some examples, the message outputting component 635 is capable of, configured to, or operable to support a means for outputting, to the first node as part of the first compliance report, a request for compliance with the EIRP information based on the signal interference at the second node satisfying the interference threshold.

In some examples, the message monitoring component 645 is capable of, configured to, or operable to support a means for obtaining a compliance satisfaction report from the first node indicating that the first node has changed to comply with the EIRP information based on the request for compliance.

In some examples, the EIRP monitoring component 630 is capable of, configured to, or operable to support a means for monitoring, during the first time duration, the EIRP level of the set of multiple beams of the first node based on the message, where the request for compliance is output based on a determination that the set of multiple beams of the first node do not conform to the EIRP information.

In some examples, the message outputting component 635 is capable of, configured to, or operable to support a means for outputting, to the first node, a request for a certificate of compliance that the set of multiple beams of the first node conform to the EIRP information. In some examples, the message monitoring component 645 is capable of, configured to, or operable to support a means for obtaining, from the first node, the certificate of compliance based on the request.

In some examples, the EIRP information includes an EIRP mask associated with the environment in which the first node is located.

In some cases, the EIRP information obtaining component 625, the EIRP monitoring component 630, the message outputting component 635, the beam information monitoring component 640, and the message monitoring component 645 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the EIRP information obtaining component 625, the EIRP monitoring component 630, the message outputting component 635, the beam information monitoring component 640, and the message monitoring component 645 discussed herein.

Figure 7:
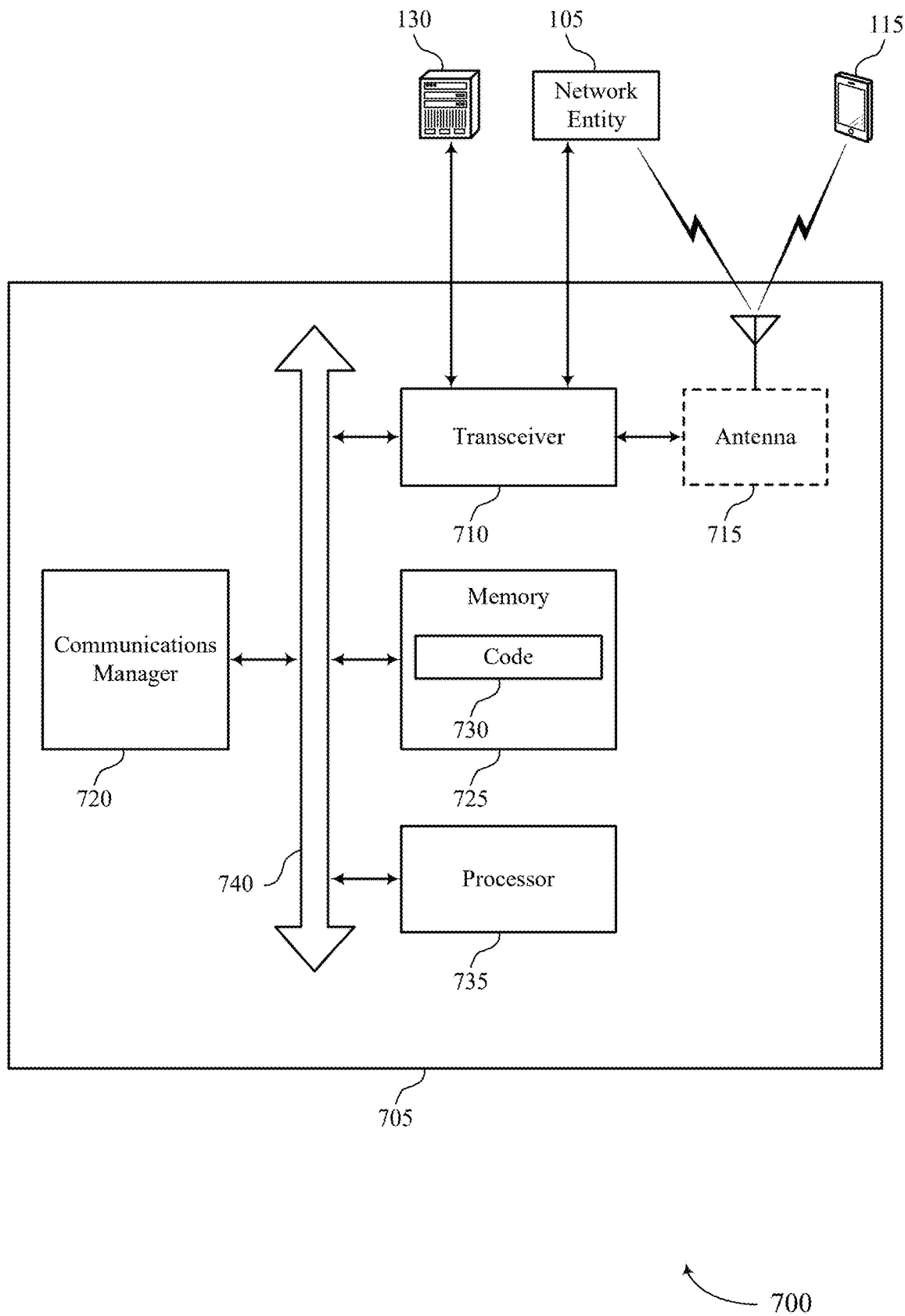
FIG. 7 shows a diagram of a system including a device that supports techniques for EIRP conformance verification by a regulatory node in accordance with one or more aspects of the present disclosure.

FIG. 7 shows a diagram of a system 700 including a device 705 that supports techniques for EIRP conformance verification by a regulatory node in accordance with one or more aspects of the present disclosure. The device 705 may be an example of or include components of a device 405, a device 505, or a network entity 105 as described herein. The device 705 may communicate with other network devices or network equipment such as one or more of the network entities 105, UEs 115, or any combination thereof. The communications may include communications over one or more wired interfaces, over one or more wireless interfaces, or any combination thereof. The device 705 may include components that support outputting and obtaining communications, such as a communications manager 720, a transceiver 710, one or more antennas 715, at least one memory 725, code 730, and at least one processor 735. These components may be in electronic communication or otherwise coupled (e.g., operatively, communicatively, functionally, electronically, electrically) via one or more buses (e.g., a bus 740).

The transceiver 710 may support bi-directional communications via wired links, wireless links, or both as described herein. In some examples, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some examples, the device 705 may include one or more antennas 715, which may be capable of transmitting or receiving wireless transmissions (e.g., concurrently). The transceiver 710 may also include a modem to modulate signals, to provide the modulated signals for transmission (e.g., by one or more antennas 715, by a wired transmitter), to receive modulated signals (e.g., from one or more antennas 715, from a wired receiver), and to demodulate signals. In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof. In some implementations, the transceiver 710 may include or be configured for coupling with one or more processors or one or more memory components that are operable to perform or support operations based on received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or one or more memory components (e.g., the at least one processor 735, the at least one memory 725, or both), may be included in a chip or chip assembly that is installed in the device 705. In some examples, the transceiver 710 may be operable to support communications via one or more communications links (e.g., communication link(s) 125, backhaul communication link(s) 120, a midhaul communication link 162, a fronthaul communication link 168).

The at least one memory 725 may include RAM, ROM, or any combination thereof. The at least one memory 725 may store computer-readable, computer-executable, or processor-executable code, such as the code 730. The code 730 may include instructions that, when executed by one or more of the at least one processor 735, cause the device 705 to perform various functions described herein. The code 730 may be stored in a non-transitory computer-readable medium such as system memory or another type of memory. In some cases, the code 730 may not be directly executable by a processor of the at least one processor 735 but may cause a computer (e.g., when compiled and executed) to perform functions described herein. In some cases, the at least one memory 725 may include, among other things, a BIOS which may control basic hardware or software operation such as the interaction with peripheral components or devices. In some examples, the at least one processor 735 may include multiple processors and the at least one memory 725 may include multiple memories. One or more of the multiple processors may be coupled with one or more of the multiple memories which may, individually or collectively, be configured to perform various functions herein (for example, as part of a processing system).

The at least one processor 735 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 735 may be configured to operate a memory array using a memory controller. In some other cases, a memory controller may be integrated into one or more of the at least one processor 735. The at least one processor 735 may be configured to execute computer-readable instructions stored in a memory (e.g., one or more of the at least one memory 725) to cause the device 705 to perform various functions (e.g., functions or tasks supporting techniques for EIRP conformance verification by a regulatory node). For example, the device 705 or a component of the device 705 may include at least one processor 735 and at least one memory 725 coupled with one or more of the at least one processor 735, the at least one processor 735 and the at least one memory 725 configured to perform various functions described herein. The at least one processor 735 may be an example of a cloud-computing platform (e.g., one or more physical nodes and supporting software such as operating systems, virtual machines, or container instances) that may host the functions (e.g., by executing code 730) to perform the functions of the device 705. The at least one processor 735 may be any one or more suitable processors capable of executing scripts or instructions of one or more software programs stored in the device 705 (such as within one or more of the at least one memory 725).

In some examples, the at least one processor 735 may include multiple processors and the at least one memory 725 may include multiple memories. One or more of the multiple processors may be coupled with one or more of the multiple memories, which may, individually or collectively, be configured to perform various functions herein. In some examples, the at least one processor 735 may be a component of a processing system, which may refer to a system (such as a series) of machines, circuitry (including, for example, one or both of processor circuitry (which may include the at least one processor 735) and memory circuitry (which may include the at least one memory 725)), or components, that receives or obtains inputs and processes the inputs to produce, generate, or obtain a set of outputs. The processing system may be configured to perform one or more of the functions described herein. For example, the at least one processor 735 or a processing system including the at least one processor 735 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 725 or otherwise, to perform one or more of the functions described herein.

In some examples, a bus 740 may support communications of (e.g., within) a protocol layer of a protocol stack. In some examples, a bus 740 may support communications associated with a logical channel of a protocol stack (e.g., between protocol layers of a protocol stack), which may include communications performed within a component of the device 705, or between different components of the device 705 that may be co-located or located in different locations (e.g., where the device 705 may refer to a system in which one or more of the communications manager 720, the transceiver 710, the at least one memory 725, the code 730, and the at least one processor 735 may be located in one of the different components or divided between different components).

In some examples, the communications manager 720 may manage aspects of communications with a core network 130 (e.g., via one or more wired or wireless backhaul links). For example, the communications manager 720 may manage the transfer of data communications for client devices, such as one or more UEs 115. In some examples, the communications manager 720 may manage communications with one or more other network entities 105, and may include a controller or scheduler for controlling communications with UEs 115 (e.g., in cooperation with the one or more other network devices). In some examples, the communications manager 720 may support an X2 interface within an LTE/LTE-A wireless communications network technology to provide communication between network entities 105.

The communications manager 720 may support wireless communications in accordance with examples as disclosed herein. For example, the communications manager 720 is capable of, configured to, or operable to support a means for obtaining EIRP information corresponding to an environment in which a first node is located, where the EIRP information includes respective permissible EIRP levels over a range of angles relative to the environment. The communications manager 720 is capable of, configured to, or operable to support a means for monitoring, during a first time duration, an EIRP level of a set of multiple beams of the first node over the range of angles in accordance with the EIRP information. The communications manager 720 is capable of, configured to, or operable to support a means for outputting a first compliance report associated with the first time duration, where the first compliance report indicates whether one or more of the set of multiple beams conforms to the EIRP information.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (e.g., receiving, obtaining, monitoring, outputting, transmitting) using or otherwise in cooperation with the transceiver 710, the one or more antennas 715 (e.g., where applicable), or any combination thereof. Although the communications manager 720 is illustrated as a separate component, in some examples, one or more functions described with reference to the communications manager 720 may be supported by or performed by the transceiver 710, one or more of the at least one processor 735, one or more of the at least one memory 725, the code 730, or any combination thereof (for example, by a processing system including at least a portion of the at least one processor 735, the at least one memory 725, the code 730, or any combination thereof). For example, the code 730 may include instructions executable by one or more of the at least one processor 735 to cause the device 705 to perform various aspects of techniques for EIRP conformance verification by a regulatory node as described herein, or the at least one processor 735 and the at least one memory 725 may be otherwise configured to, individually or collectively, perform or support such operations.

Figure 8:
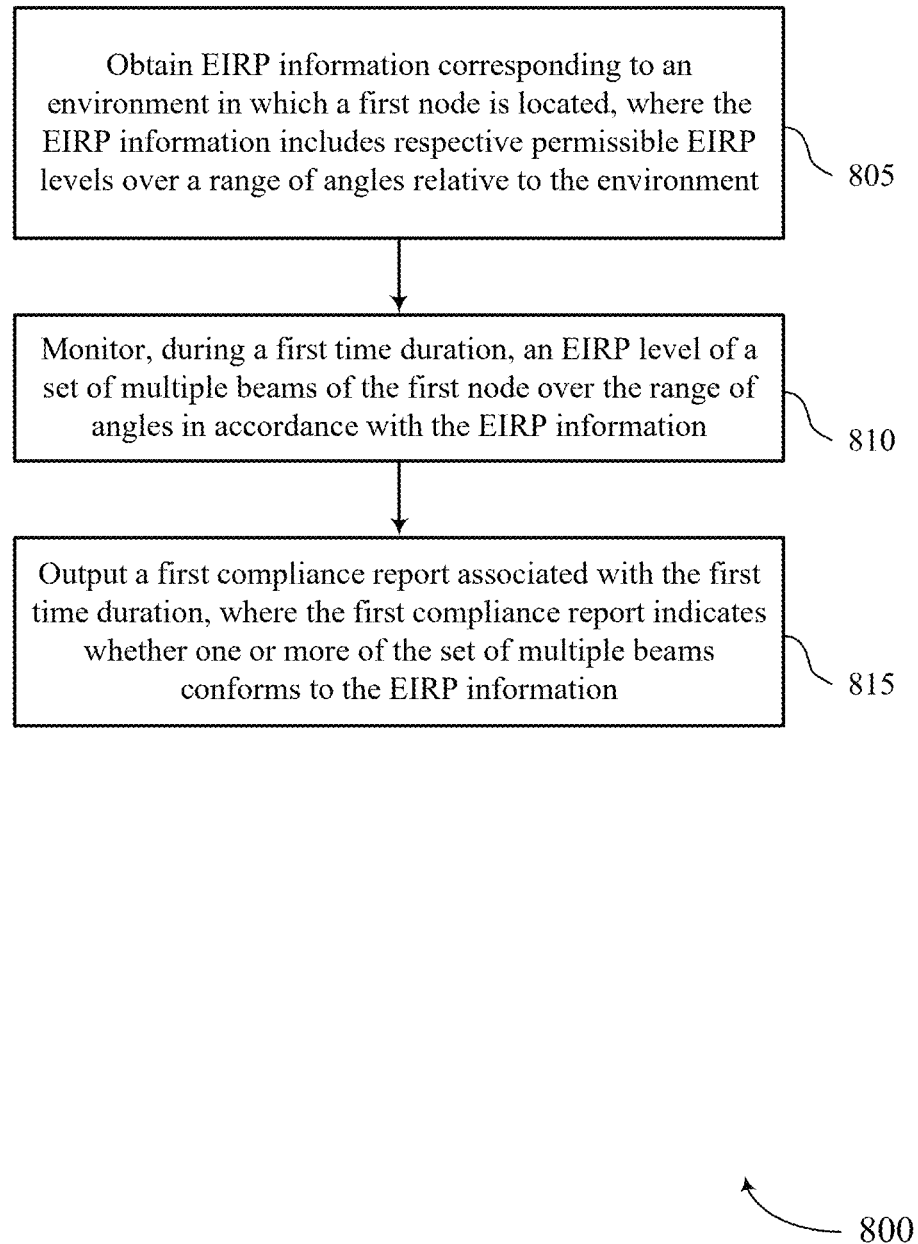
FIGS. 8 and 9 show flowcharts illustrating methods that support techniques for EIRP conformance verification by a regulatory node in accordance with one or more aspects of the present disclosure.

FIG. 8 shows a flowchart illustrating a method 800 that supports techniques for EIRP conformance verification by a regulatory node in accordance with one or more aspects of the present disclosure. The operations of the method 800 may be implemented by a network entity or its components as described herein. For example, the operations of the method 800 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 805, the method may include obtaining EIRP information corresponding to an environment in which a first node is located, where the EIRP information includes respective permissible EIRP levels over a range of angles relative to the environment. The operations of 805 may be performed in accordance with examples as disclosed herein. In some examples, aspects of the operations of 805 may be performed by an EIRP information obtaining component 625 as described with reference to FIG. 6.

At 810, the method may include monitoring, during a first time duration, an EIRP level of a set of multiple beams of the first node over the range of angles in accordance with the EIRP information. The operations of 810 may be performed in accordance with examples as disclosed herein. In some examples, aspects of the operations of 810 may be performed by an EIRP monitoring component 630 as described with reference to FIG. 6.

At 815, the method may include outputting a first compliance report associated with the first time duration, where the first compliance report indicates whether one or more of the set of multiple beams conforms to the EIRP information. The operations of 815 may be performed in accordance with examples as disclosed herein. In some examples, aspects of the operations of 815 may be performed by a message outputting component 635 as described with reference to FIG. 6.

Figure 9:
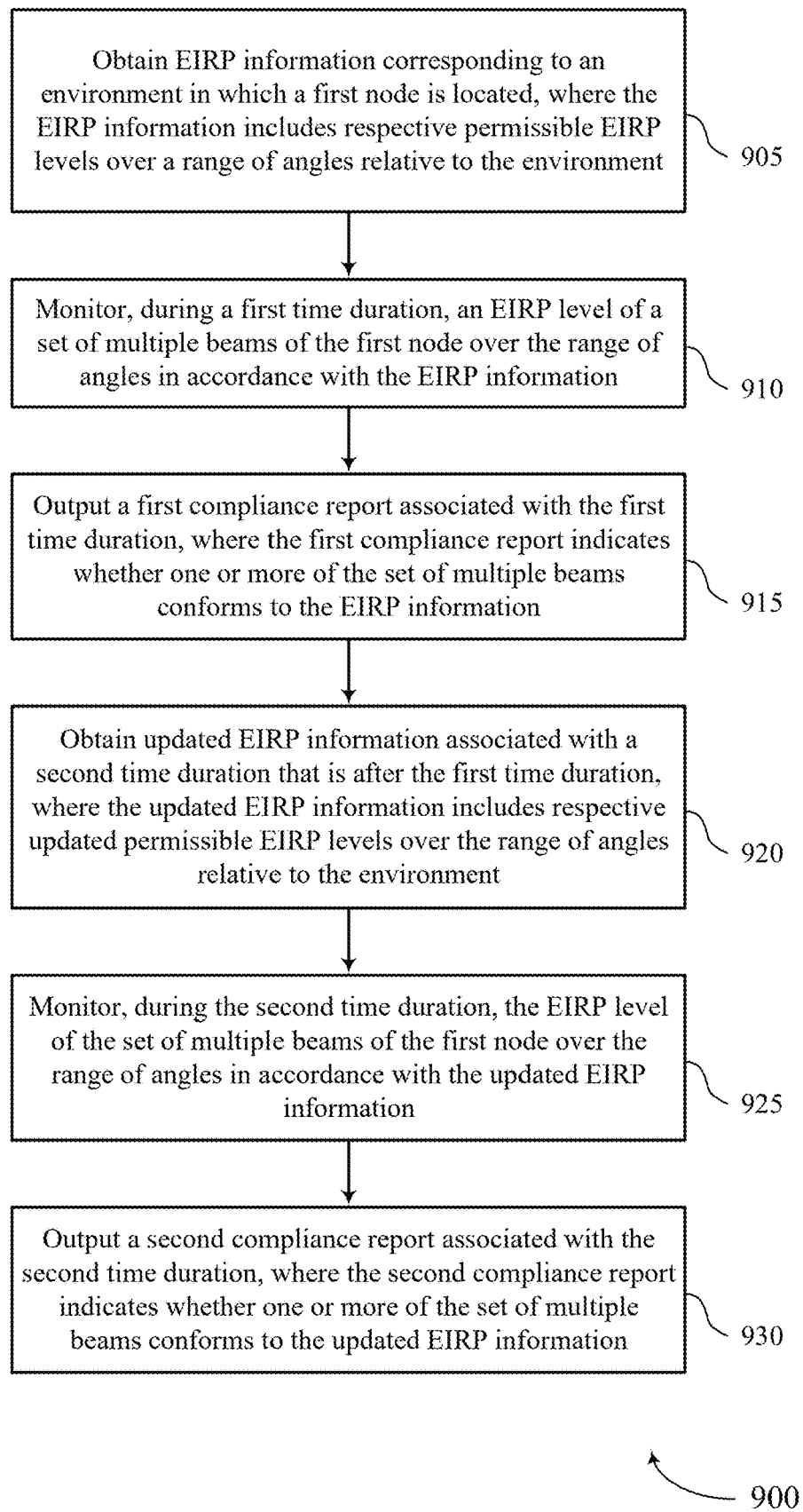

FIG. 9 shows a flowchart illustrating a method 900 that supports techniques for EIRP conformance verification by a regulatory node in accordance with one or more aspects of the present disclosure. The operations of the method 900 may be implemented by a network entity or its components as described herein. For example, the operations of the method 900 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 905, the method may include obtaining EIRP information corresponding to an environment in which a first node is located, where the EIRP information includes respective permissible EIRP levels over a range of angles relative to the environment. The operations of 905 may be performed in accordance with examples as disclosed herein. In some examples, aspects of the operations of 905 may be performed by an EIRP information obtaining component 625 as described with reference to FIG. 6.

At 910, the method may include monitoring, during a first time duration, an EIRP level of a set of multiple beams of the first node over the range of angles in accordance with the EIRP information. The operations of 910 may be performed in accordance with examples as disclosed herein. In some examples, aspects of the operations of 910 may be performed by an EIRP monitoring component 630 as described with reference to FIG. 6.

At 915, the method may include outputting a first compliance report associated with the first time duration, where the first compliance report indicates whether one or more of the set of multiple beams conforms to the EIRP information. The operations of 915 may be performed in accordance with examples as disclosed herein. In some examples, aspects of the operations of 915 may be performed by a message outputting component 635 as described with reference to FIG. 6.

At 920, the method may include obtaining updated EIRP information associated with a second time duration that is after the first time duration, where the updated EIRP information includes respective updated permissible EIRP levels over the range of angles relative to the environment. The operations of 920 may be performed in accordance with examples as disclosed herein. In some examples, aspects of the operations of 920 may be performed by an EIRP information obtaining component 625 as described with reference to FIG. 6.

At 925, the method may include monitoring, during the second time duration, the EIRP level of the set of multiple beams of the first node over the range of angles in accordance with the updated EIRP information. The operations of 925 may be performed in accordance with examples as disclosed herein. In some examples, aspects of the operations of 925 may be performed by an EIRP monitoring component 630 as described with reference to FIG. 6.

At 930, the method may include outputting a second compliance report associated with the second time duration, where the second compliance report indicates whether one or more of the set of multiple beams conforms to the updated EIRP information. The operations of 930 may be performed in accordance with examples as disclosed herein. In some examples, aspects of the operations of 930 may be performed by a message outputting component 635 as described with reference to FIG. 6.

The following provides an overview of aspects of the present disclosure:

Aspect 1: A method for wireless communications, at a regulatory node, comprising: obtaining EIRP information corresponding to an environment in which a first node is located, wherein the EIRP information comprises respective permissible EIRP levels over a range of angles relative to the environment; monitoring, during a first time duration, an EIRP level of a plurality of beams of the first node over the range of angles in accordance with the EIRP information; and outputting a first compliance report associated with the first time duration, wherein the first compliance report indicates whether one or more of the plurality of beams conforms to the EIRP information.

Aspect 2: The method of aspect 1, further comprising: obtaining updated EIRP information associated with a second time duration that is after the first time duration, wherein the updated EIRP information comprises respective updated permissible EIRP levels over the range of angles relative to the environment; monitoring, during the second time duration, the EIRP level of the plurality of beams of the first node over the range of angles in accordance with the updated EIRP information; and outputting a second compliance report associated with the second time duration, wherein the second compliance report indicates whether one or more of the plurality of beams conforms to the updated EIRP information.

Aspect 3: The method of any of aspects 1 through 2, further comprising: obtaining, from the first node, beam configuration information associated with the plurality of beams of the first node, wherein the EIRP level of the plurality of beams is monitored during the first time duration in accordance with the beam configuration information.

Aspect 4: The method of aspect 3, wherein the beam configuration information comprises at least beam weights associated with each of the plurality of beams, or respective beam types associated with each of the plurality of beams, or respective steering angles associated with each of the plurality of beams, or an AAS configuration associated with the plurality of beams, or a combination thereof.

Aspect 5: The method of any of aspects 1 through 4, further comprising: obtaining, from a second node, a message indicating that a signal interference at the second node satisfies an interference threshold; and outputting, to the first node as part of the first compliance report, a request for compliance with the EIRP information based at least in part on the signal interference at the second node satisfying the interference threshold.

Aspect 6: The method of aspect 5, further comprising: obtaining a compliance satisfaction report from the first node indicating that the first node has changed to comply with the EIRP information based at least in part on the request for compliance.

Aspect 7: The method of any of aspects 5 through 6, further comprising: monitoring, during the first time duration, the EIRP level of the plurality of beams of the first node based at least in part on the message, wherein the request for compliance is output based at least in part on a determination that the plurality of beams of the first node do not conform to the EIRP information.

Aspect 8: The method of any of aspects 1 through 7, further comprising: outputting, to the first node, a request for a certificate of compliance that the plurality of beams of the first node conform to the EIRP information; and obtaining, from the first node, the certificate of compliance based at least in part on the request.

Aspect 9: The method of any of aspects 1 through 8, wherein the EIRP information comprises an EIRP mask associated with the environment in which the first node is located.

Aspect 10: A regulatory node for wireless communications, comprising one or more memories storing processor-executable code, and one or more processors coupled with the one or more memories and individually or collectively operable to execute the code to cause the regulatory node to perform a method of any of aspects 1 through 9.

Aspect 11: A regulatory node for wireless communications, comprising at least one means for performing a method of any of aspects 1 through 9.

Aspect 12: A non-transitory computer-readable medium storing code for wireless communications, the code comprising instructions executable by one or more processors to perform a method of any of aspects 1 through 9.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A regulatory node, comprising:
one or more memories storing processor-executable code; and
one or more processors coupled with the one or more memories, wherein the one or more processors are individually or collectively configured to cause the regulatory node to:
obtain equivalent isotropic radiated power (EIRP) information corresponding to an environment in which a first node is located, wherein the EIRP information comprises respective permissible EIRP levels over a range of angles relative to the environment;
monitor, during a first time duration, an EIRP level of a plurality of beams of the first node over the range of angles in accordance with the EIRP information; and
output a first compliance report associated with the first time duration, wherein the first compliance report indicates whether one or more of the plurality of beams conforms to the EIRP information.

2. The regulatory node of claim 1, wherein the one or more processors are individually or collectively further configured to cause the regulatory node to:
obtain updated EIRP information associated with a second time duration that is after the first time duration, wherein the updated EIRP information comprises respective updated permissible EIRP levels over the range of angles relative to the environment;
monitor, during the second time duration, the EIRP level of the plurality of beams of the first node over the range of angles in accordance with the updated EIRP information; and
output a second compliance report associated with the second time duration, wherein the second compliance report indicates whether one or more of the plurality of beams conforms to the updated EIRP information.

3. The regulatory node of claim 1, wherein the one or more processors are individually or collectively further configured to cause the regulatory node to:
obtain, from the first node, beam configuration information associated with the plurality of beams of the first node, wherein the EIRP level of the plurality of beams is monitored during the first time duration in accordance with the beam configuration information.

4. The regulatory node of claim 3, wherein the beam configuration information comprises at least beam weights associated with each of the plurality of beams, or respective beam types associated with each of the plurality of beams, or respective steering angles associated with each of the plurality of beams, or an active antenna system (AAS) configuration associated with the plurality of beams, or a combination thereof.

5. The regulatory node of claim 1, wherein the one or more processors are individually or collectively further configured to cause the regulatory node to:
obtain, from a second node, a message indicating that a signal interference at the second node satisfies an interference threshold; and
output, to the first node as part of the first compliance report, a request for compliance with the EIRP information based at least in part on the signal interference at the second node satisfying the interference threshold.

6. The regulatory node of claim 5, wherein the one or more processors are individually or collectively further configured to cause the regulatory node to:
obtain a compliance satisfaction report from the first node indicating that the first node has changed to comply with the EIRP information based at least in part on the request for compliance.

7. The regulatory node of claim 5, wherein the one or more processors are individually or collectively further configured to cause the regulatory node to:

monitor, during the first time duration, the EIRP level of the plurality of beams of the first node based at least in part on the message, wherein the request for compliance is output based at least in part on a determination that the plurality of beams of the first node do not conform to the EIRP information.

8. The regulatory node of claim 1, wherein the one or more processors are individually or collectively further configured to cause the regulatory node to:
output, to the first node, a request for a certificate of compliance that the plurality of beams of the first node conform to the EIRP information; and
obtain, from the first node, the certificate of compliance based at least in part on the request.

9. The regulatory node of claim 1, wherein the EIRP information comprises an EIRP mask associated with the environment in which the first node is located.

10. A method for wireless communications, at a regulatory node, comprising:
obtaining equivalent isotropic radiated power (EIRP) information corresponding to an environment in which a first node is located, wherein the EIRP information comprises respective permissible EIRP levels over a range of angles relative to the environment;
monitoring, during a first time duration, an EIRP level of a plurality of beams of the first node over the range of angles in accordance with the EIRP information; and
outputting a first compliance report associated with the first time duration, wherein the first compliance report indicates whether one or more of the plurality of beams conforms to the EIRP information.

11. The method of claim 10, further comprising:
obtaining updated EIRP information associated with a second time duration that is after the first time duration, wherein the updated EIRP information comprises respective updated permissible EIRP levels over the range of angles relative to the environment;
monitoring, during the second time duration, the EIRP level of the plurality of beams of the first node over the range of angles in accordance with the updated EIRP information; and
outputting a second compliance report associated with the second time duration, wherein the second compliance report indicates whether one or more of the plurality of beams conforms to the updated EIRP information.

12. The method of claim 10, further comprising:
obtaining, from the first node, beam configuration information associated with the plurality of beams of the first node, wherein the EIRP level of the plurality of beams is monitored during the first time duration in accordance with the beam configuration information.

13. The method of claim 12, wherein the beam configuration information comprises at least beam weights associated with each of the plurality of beams, or respective beam types associated with each of the plurality of beams, or respective steering angles associated with each of the plurality of beams, or an active antenna system (AAS) configuration associated with the plurality of beams, or a combination thereof.

14. The method of claim 10, further comprising:
obtaining, from a second node, a message indicating that a signal interference at the second node satisfies an interference threshold; and
outputting, to the first node as part of the first compliance report, a request for compliance with the EIRP information based at least in part on the signal interference at the second node satisfying the interference threshold.

15. The method of claim 14, further comprising:
obtaining a compliance satisfaction report from the first node indicating that the first node has changed to comply with the EIRP information based at least in part on the request for compliance.

16. The method of claim 14, further comprising:
monitoring, during the first time duration, the EIRP level of the plurality of beams of the first node based at least in part on the message, wherein the request for compliance is output based at least in part on a determination that the plurality of beams of the first node do not conform to the EIRP information.

17. The method of claim 10, further comprising:
outputting, to the first node, a request for a certificate of compliance that the plurality of beams of the first node conform to the EIRP information; and
obtaining, from the first node, the certificate of compliance based at least in part on the request.

18. The method of claim 10, wherein the EIRP information comprises an EIRP mask associated with the environment in which the first node is located.

19. A non-transitory computer-readable medium storing code for wireless communications, the code comprising instructions executable by one or more processors to:
obtain equivalent isotropic radiated power (EIRP) information corresponding to an environment in which a first node is located, wherein the EIRP information comprises respective permissible EIRP levels over a range of angles relative to the environment;
monitor, during a first time duration, an EIRP level of a plurality of beams of the first node over the range of angles in accordance with the EIRP information; and
output a first compliance report associated with the first time duration, wherein the first compliance report indicates whether one or more of the plurality of beams conforms to the EIRP information.

20. The non-transitory computer-readable medium of claim 19, wherein the instructions are further executable by the one or more processors to:
obtain updated EIRP information associated with a second time duration that is after the first time duration, wherein the updated EIRP information comprises respective updated permissible EIRP levels over the range of angles relative to the environment;
monitor, during the second time duration, the EIRP level of the plurality of beams of the first node over the range of angles in accordance with the updated EIRP information; and
output a second compliance report associated with the second time duration, wherein the second compliance report indicates whether one or more of the plurality of beams conforms to the updated EIRP information.

* * * * *